(12) United States Patent
Benavides

(10) Patent No.: US 11,296,509 B1
(45) Date of Patent: Apr. 5, 2022

(54) ZERO-SEQUENCE CURRENT BALANCER WITH A REAL POWER INJECTOR FOR A THREE-PHASE POWER SYSTEM

(71) Applicant: Switched Source PB, LLC, Vestal, NY (US)

(72) Inventor: Nicholas Benavides, Zionsville, IN (US)

(73) Assignee: SWITCHED SOURCE PB, LLC, Vestal, NY (US)

(*) Notice: Subject to any disclaimer, the term of this patent is extended or adjusted under 35 U.S.C. 154(b) by 0 days.

(21) Appl. No.: 17/306,109

(22) Filed: May 3, 2021

(51) Int. Cl.
*H02J 3/18* (2006.01)
*H02M 5/458* (2006.01)
*H02M 1/00* (2006.01)

(52) U.S. Cl.
CPC ......... *H02J 3/1857* (2013.01); *H02M 1/0095* (2021.05); *H02M 5/4585* (2013.01)

(58) Field of Classification Search
CPC ...... H02M 15/40; H02M 15/44; H02M 15/45; H02M 15/548; H02M 15/4585; H02M 15/46; H02M 15/48; H02M 1/0095; H02J 3/1857
See application file for complete search history.

(56) References Cited

U.S. PATENT DOCUMENTS

| | | | |
|---|---|---|---|
| 4,555,659 A | 11/1985 | Gyugyi | |
| 5,568,371 A | 10/1996 | Pitel et al. | |
| 5,574,356 A | 11/1996 | Parker | |
| 5,831,842 A | 11/1998 | Ogasawara et al. | |
| 5,984,173 A | 11/1999 | Edwards | |
| 8,737,097 B1 | 5/2014 | Swamy | |
| 9,285,817 B2 | 3/2016 | Wong | |
| 9,294,003 B2 | 3/2016 | Peng | |
| 2003/0197989 A1 | 10/2003 | Nojima | |
| 2005/0253564 A1 | 11/2005 | Choi | |
| 2014/0362618 A1 | 12/2014 | Hassan | |
| 2015/0029764 A1* | 1/2015 | Peng | H02J 3/1814 363/37 |
| 2016/0365727 A1* | 12/2016 | Kam | H02H 7/28 |
| 2018/0056793 A1* | 3/2018 | Rozman | H02K 19/16 |

OTHER PUBLICATIONS

Ou et al. "Analysis of Zig-Zag Transformer Applying in the Three-Phase Four-Wire Distribution Power System" IEEE Transactions on Power Delivery, vol. 20, No. 2, Apr. 2005.

(Continued)

*Primary Examiner* — Nguyen Tran

(74) *Attorney, Agent, or Firm* — Philip E. Levy; Eckert Seamans Cherin & Mellott, LLC

(57) ABSTRACT

A zero-sequence current balancer for a controlling zero-sequence current in a three-phase power system includes a cascade multilevel modular inverter (CMMI) coupled to the three-phase power system, wherein the CMMI has a plurality of modules, each module having a module capacitor, and a real power injector circuit provided between the three-phase power system and the CMMI, wherein the real power injector circuit is structured and configured to cause real power to injected into and/or absorbed from the CMMI to regulate a voltage of one or more of the module capacitors.

5 Claims, 12 Drawing Sheets

(56) References Cited

OTHER PUBLICATIONS

Ou et. al."A Three-Phase Four-Wire Power Filter Comprising a Three-Phase Three-Wire Active Power Filter and a Zig-Zag Transformer" IEEE Transactions on Power Electronics, vol. 23, No. 1, Jan. 2008.
Singh, et. al. "Reduced Rating VSC With a Zig-Zag Transformer for Current Compensation in a Three-Phase Four-Wire Distribution System" IEEE Transactions on Power Delivery vol. 24, No. 1, Jan. 2009.
Choi, S. and Jang, M. "Analysis and Control of a Single-Phase-Inverter-Zigzag-Transformer Hybrid Neutral-Current Suppressor in Three-Phase Four-Wire Systems" IEEE Transactions on Industrial Electronics, vol. 54, No. 4, Aug. 2007.
Nagarjuna, et al. "Reduced Rating VSC with a Zig-Zag Transformer for Current Compensation in a Three-Phase Four-Wire Distribution System" International Journal of Modern Engineering Research, vol. 2, Issue.4, Jul.-Aug. 2012 pp. 2957-2963.

\* cited by examiner

ZERO-SEQUENCE CURRENT BALANCER WITH A REAL POWER INJECTOR FOR A THREE-PHASE POWER SYSTEM

TECHNICAL FIELD OF THE DISCLOSED EMBODIMENTS

The embodiments disclosed herein generally relate to three-phase power systems and, more specifically, to a zero-sequence current balancer for a three-phase power system, wherein the zero-sequence current balancer employs a real power injector for injecting real power into and/or absorbing real power from the system (in a unidirectional or bidirectional manner) to replenish any internal power loss and/or regulate the capacitor voltages of one or more Cascade Multilevel Modular Inverters (CMMIs) forming part of the zero-sequence current balancer of the disclosed concept.

BACKGROUND OF THE DISCLOSED EMBODIMENTS

An electrical power system normally operates in a balanced three-phase sinusoidal steady-state mode. However, there are certain situations that can cause unbalanced operations. The most severe of these would be a fault or short circuit. Examples may include a tree in contact with a conductor, a lightning strike, or downed power line. The basic theory of symmetrical components is that phase currents and voltages in a three-phase power system can be represented by three single-phase components. These are positive-, negative- and zero-sequence components. The positive sequence component of current or voltage has the same rotation as the power system. This component represents a balanced load.

If the generator phase currents are equal and displaced by exactly 120°, only positive-sequence current will exist. A current or voltage unbalance between phases in magnitude or phase angle gives rise to negative- and zero-sequence components. The negative sequence component has a rotation opposite that of the power system. The zero-sequence component represents an unbalance that causes current flow in the neutral.

High levels of positive-, negative- and zero-sequence harmonic currents are generated by the single-phase, non-linear loads that are connected between phase and neutral in a three-phase, four-wire distribution system. Although each single-phase, non-linear load is normally small, they often represent 95% to 100% of all loads connected to a low voltage distribution system in an office, data center or audio-video facility, for example. Perhaps more important, a driver of these imbalances is increased penetration of single-phase (e.g., residential) renewable power generation installations, which are "large" and somewhat unpredictable from a long-term planning standpoint.

Unlike the positive- and negative-sequence phase currents, which are each displaced by 120° in a three-phase system, zero-sequence currents are each displaced by 0° and are therefore "in-phase". As a result, zero-sequence currents combine arithmetically at the source transformer's neutral terminal and return to the nonlinear loads via the system's neutral conductor. In a worst case scenario, the resulting zero-sequence neutral currents may be greater than 1.5 times the phase currents.

Zero-sequence currents, acting in an Ohm's Law relationship with the system's zero-sequence impedances, produce zero-sequence voltages. These zero-sequence voltages distort the fundamental voltage waveforms. Systems and methods for alleviating fundamental frequency line load imbalance in the distribution system will thus reduce line loss and increase power system capacity without installing new lines.

Systems and methods for reducing zero-sequence current in a three-phase power system are therefore desirable. The presently disclosed embodiments are directed toward meeting this need.

SUMMARY

In one embodiment, a zero-sequence current balancer for a controlling zero-sequence current in a three-phase power system is provided that includes a cascade multilevel modular inverter (CMMI) coupled to the three-phase power system, wherein the CMMI has a plurality of modules, each module having a module capacitor, and a real power injector circuit provided between the three-phase power system and the CMMI, wherein the real power injector circuit is structured and configured to cause real power to be injected into and/or absorbed from the CMMI to regulate a voltage of one or more of the module capacitors.

In another embodiment, a method of controlling zero-sequence current in a three-phase power system is provided. The method includes receiving an AC signal in a cascade multilevel modular inverter (CMMI) coupled to the three-phase power system, wherein the CMMI has a plurality of modules, each module having a module capacitor; and causing real power to be injected into and/or absorbed from the CMMI to regulate a voltage of one or more of the module capacitors.

BRIEF DESCRIPTION OF DRAWINGS

The present invention will become more fully understood from the detailed description and the accompanying drawings, wherein.

DETAILED DESCRIPTION OF THE DISCLOSED EMBODIMENTS

Figure 1:
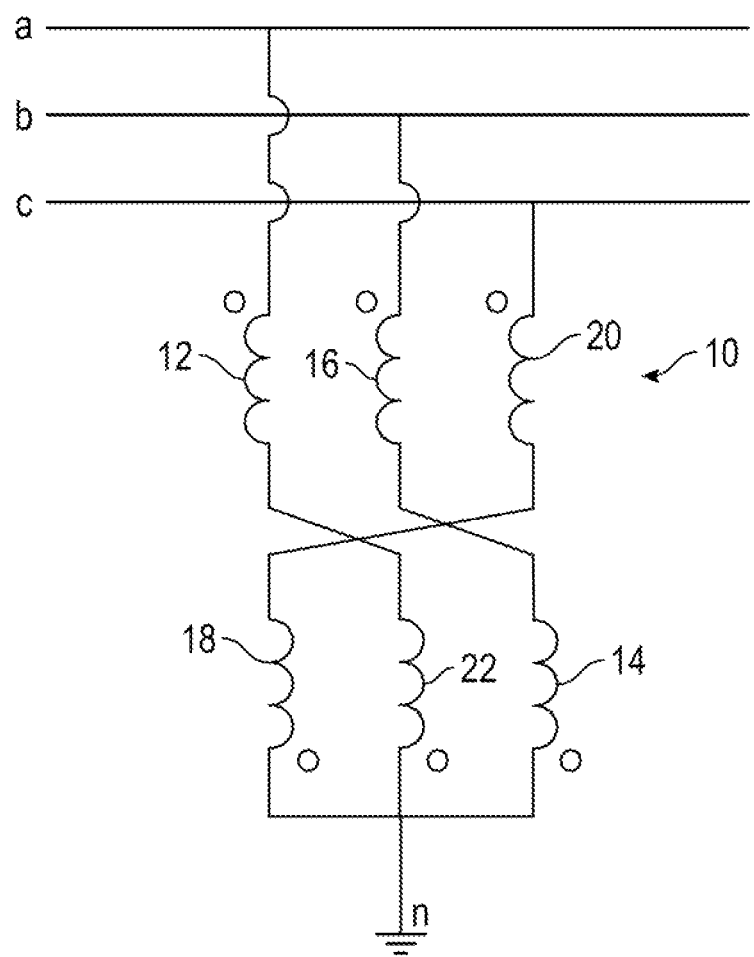
FIG. 1 is a schematic diagram illustrating a conventional four-terminal zig-zag transformer which is applied to a three-phase, four-wire electrical distribution system in accordance with an embodiment.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, the term "number" shall mean one or an integer greater than one.

For the purposes of promoting an understanding of the principles of the invention, reference will now be made to the embodiments illustrated in the drawings, and specific language will be used to describe those embodiments. It will nevertheless be understood that no limitation of the scope of the invention is intended. Alterations and modifications in the illustrated device, and further applications of the principles of the invention as illustrated therein, as would normally occur to one skilled in the art to which the invention relates are contemplated and desired to be protected. Such alternative embodiments require certain adaptations to the embodiments discussed herein that would be obvious to those skilled in the art.

FIG. 1 is a schematic diagram illustrating a conventional four-terminal zig-zag, transformer, indicated generally at 10, which is applied to a three-phase, four-wire (phases a, b, and c, and neutral conductor n) electrical distribution panel or sub-panel as a zero-sequence current filter. The zig-zag transformer has six windings: 12, 14, 16, 18, 20 and 22. Normally, each of these windings has an equal number of turns. The six windings are installed on a three-phase magnetic core which has three core legs (not shown). Windings 12 and 14 are installed on a first core leg, windings 16 and 18 are installed on a second core leg, and windings 20 and 22 are installed on a third core leg.

Connected in this fashion and under balanced zero-sequence current conditions, the zero sequence currents, which flow through each pair of windings on the common core lea, will be equal but of opposite polarity. The flux produced by each of these windings will also be equal and have opposite polarity. As a result of flux cancellation, the zero-sequence impedance of the zig-zag transformer 10 will be reduced to the resistance of the transformer's winding conductors (although there may be some leakage inductance that does not core couple).

The zero-sequence impedance of an ideal zig-zag transformer will normally be at least ten times lower than that of the power source. By connecting the zig-zag transformer 10 in parallel with the power source and the single-phase, non-linear loads (not shown), the load-generated zero-sequence currents will be attracted by the lower impedance of the zig-zag transformer 10. This will result in a reduction of the zero-sequence currents in the three-phase, four-wire system between the zig-zag transformer 10 connection and the power source.

The low zero-sequence impedance of the zig-zag transformer 10 will only balance currents as dictated by other grounding impedances throughout the distribution network. It cannot balance any zero-sequence current for which there is not a directly proportional zero-sequence voltage. The presently disclosed embodiments provide the addition of a Cascade Multilevel Modular Inverter (CMMI) that enables the zero-sequence impedance to be actively controlled, allowing injection of zero-sequence current that is less dependent on the network conditions. This additional controllability enables balancing of the local node zero-sequence, or injection control based on balancing a remote node such as an upstream feed.

Figure 2:
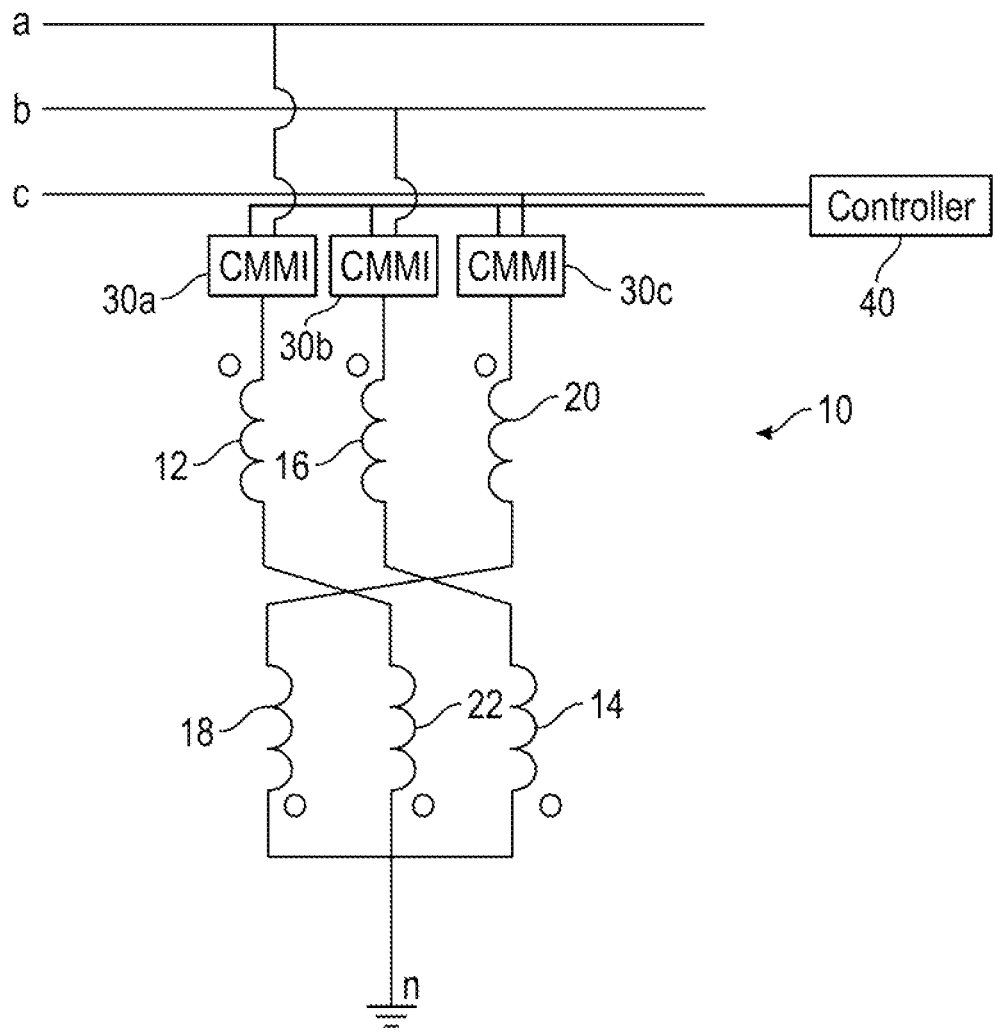
FIG. 2 is a schematic diagram illustrating a four-terminal zig-zag transformer combined with a Cascade Multilevel Modular Inverter (CMMI) topology, which is applied to a three-phase, four-wire electrical distribution system in accordance with an embodiment.

With reference now to FIG. 2, there is illustrated a schematic diagram of the zig-zag transformer 10 combined with a Cascade Multilevel Modular Inverter (CMMI) topology (sometimes also referred to as a Cascade Multilevel Inverter (CMI)) to further extend balancing capability to minimize zero-sequence current in the three-phase, four-wire electrical distribution panel or sub-panel in one embodiment. A CMMI 30a is connected between phase a and the zig-zag transformer 10, a CMMI 30b is connected between phase b and the zig-zag transformer 10, and a CMMI 30c is connected between phase c and the zig-zag transformer 10. The present disclosure contemplates the use of any CMMI design, such as those described in U.S. Pat. No. 5,642,275 to Peng et al. and U.S. Pat. No. 9,294,003 to Peng, to name just a few non-limiting examples.

As is known in the art, each CMMI 30 comprises a plurality of H-bridges (or equivalent circuitry) under the control of a controller 40, such as via a fiber optic connection to name just one non-limiting embodiment. Each H-bridge can assume only three voltages: +Vdc, 0, and, −Vdc at any given time (Vdc being the internal DC link voltage of the H-bridge). The controller 40 modulates the states of the H-bridges to build an AC waveform out of a series string of H-bridges in the CMMI 30.

The voltage is chosen by the controller 40 in order to control an equivalent impedance that draws an appropriate neutral current through the zig-zag transformer 10 (which has low zero-sequence impedance and high positive/negative sequence impedance, thereby blocking the regular balanced fundamental voltage away from the CMMI 30 modules). This neutral current is generally chosen to cancel the neutral current sensed in the line. In other embodiments, the chosen neutral current may be based on a remotely sensed imbalance, rather than on a local value, determined by the power utility as a critical load point in the system. The desired injection current is then translated by the controller into a desired zero-sequence reactive impedance, based on measurement of the local terminal voltage, allowing the controller to regulate the current without generating or consuming real power. A real power term can be added to compensate for internal power loss, but this should be very small relative to the injected current for a well-designed system. The feedback controller then modulates the voltages imposed by the CMMI H-bridges, using any of several well-known pulse-width modulation techniques, for example, to create an approximation of the instantaneous voltage needed to control the injection current with a feedback-based algorithm such as, but not limited to, a proportional-integral controller.

The zig-zag transformer 10 blocks the fundamental three-phase voltage with a high impedance and presents a relatively low impedance to common-mode currents that flow in the neutral. As such the CMMI 30 branches need only act on the voltage components associated with imbalance, and the sum of the CMMI 30 branch voltages acts on the neutral current by imposing or cancelling neutral voltage in conjunction with the transformer impedance.

Figure 3:
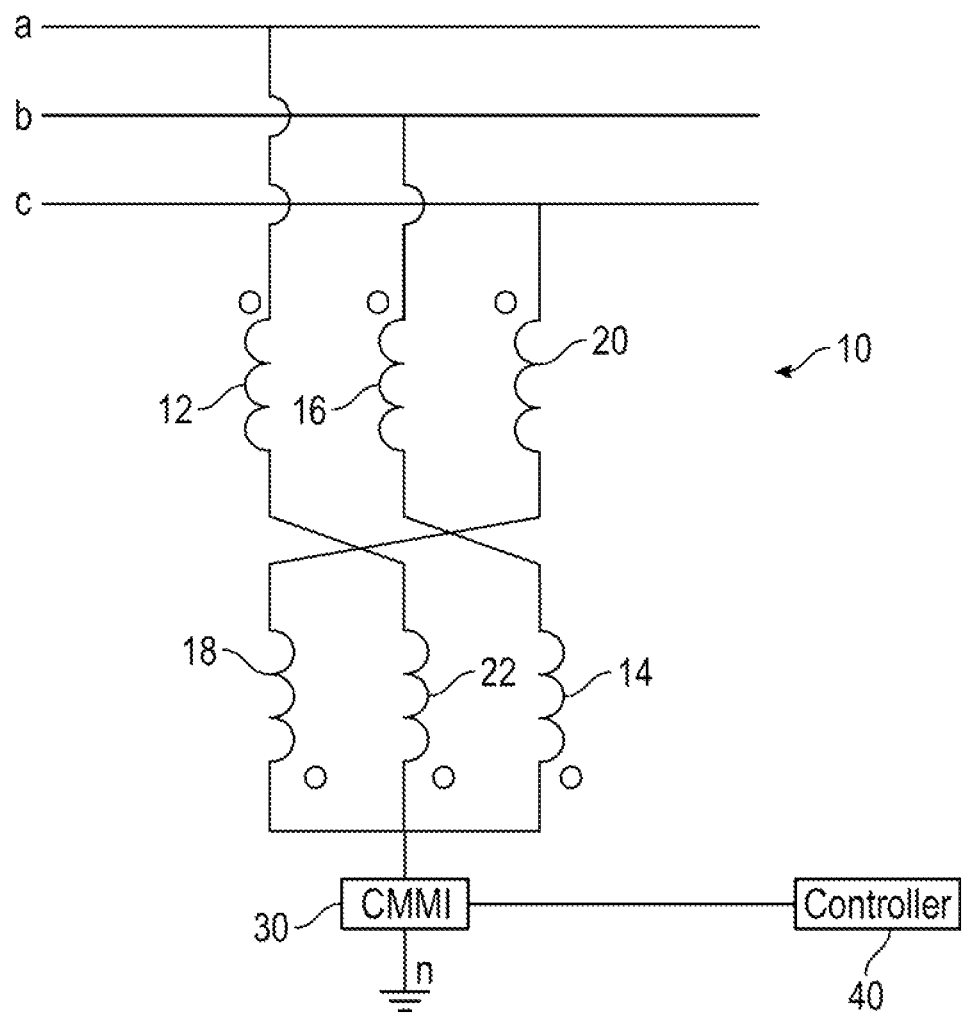
FIG. 3 is a schematic diagram illustrating a four-terminal zig-zag transformer combined with a CMMI topology to further extend balancing capability to minimize zero-sequence current in the three-phase, four-wire electrical distribution system in accordance with an embodiment.

With reference now to FIG. 3, there is illustrated a schematic diagram of the zig-zag transformer 10 combined with a CMMI topology to further extend balancing capability to minimize zero-sequence current in the three-phase, four-wire electrical distribution panel or sub-panel in one embodiment. With respect to the topology of FIG. 2, to reduce the grid neutral current, the most critical control is the sum of the voltages (common-mode). This enables the simplification of the circuit to FIG. 3, which uses a CMMI 30 module only in the neutral line, and therefore has a cost reduction benefit.

Figure 4:
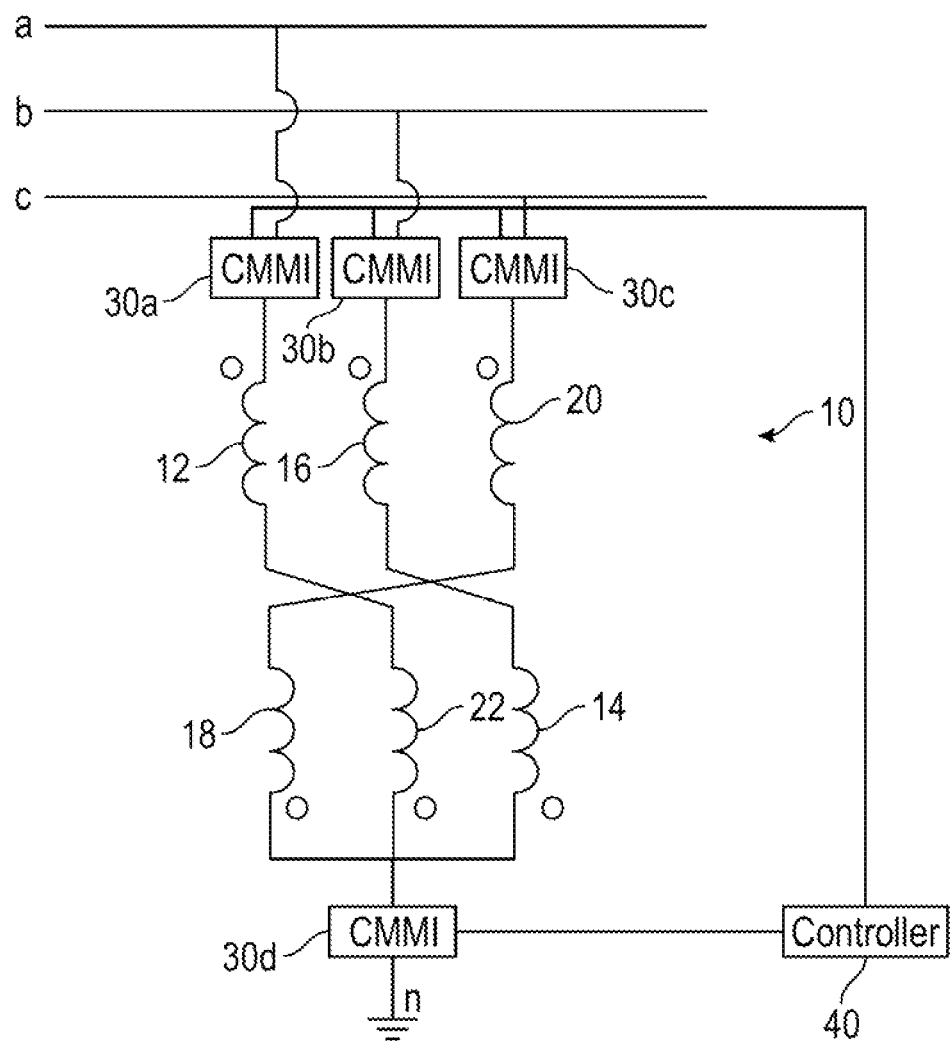
FIG. 4 is a schematic diagram illustrating a four-terminal zig-zag transformer combined with a CMMI topology to further extend balancing capability to minimize zero-sequence current in the three-phase, four-wire electrical distribution system in accordance with an embodiment.

FIG. 4 illustrates a schematic diagram of the zig-zag transformer 10 combined with a CMMI topology to further extend balancing capability to minimize zero-sequence current in the three-phase, four-wire electrical distribution panel or sub-panel in one embodiment. With respect to the topology of FIG. 4, CMMI modules 30a, 30b and 30c are included in the phase branches and CMMI module 30d is included in the neutral branch. Although this topology adds complexity and more CMMI modules 30, it may lead to improvement in grid current balance under some conditions.

Figure 5:
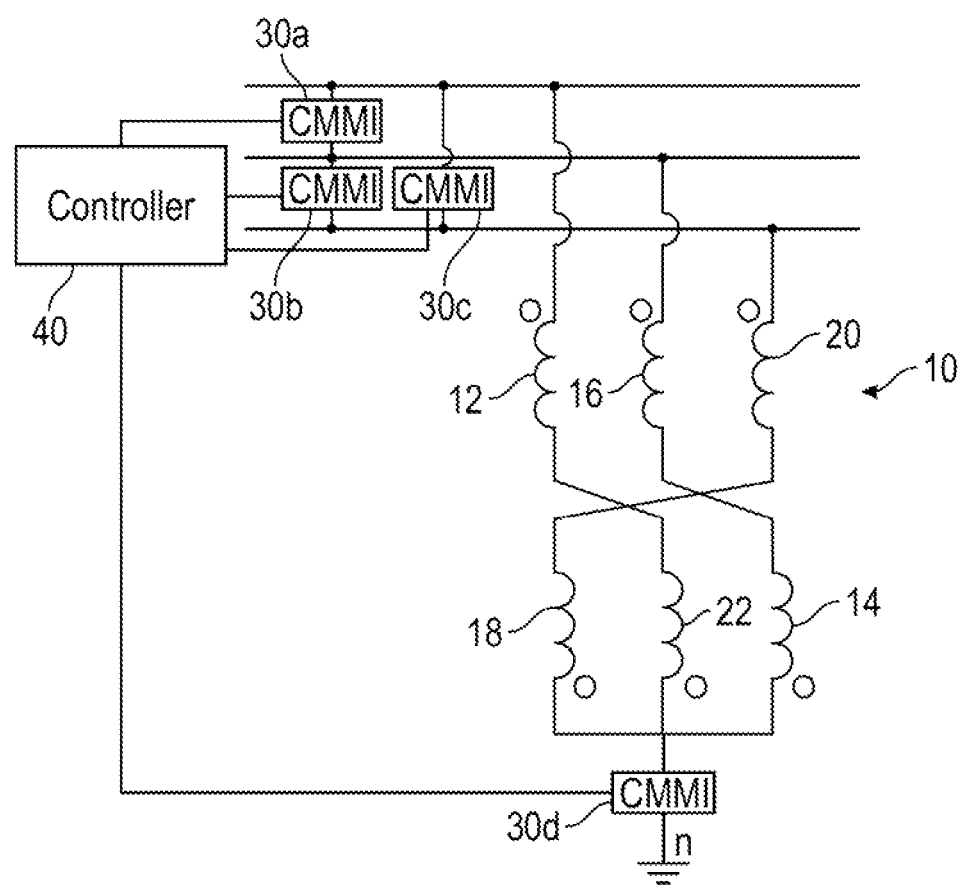
FIG. 5 is a schematic diagram illustrating a four-terminal zig-zag transformer combined with a CMMI topology to further extend balancing capability to minimize zero-sequence current and negative-sequence currents in the three-phase, four-wire electrical distribution system in accordance with an embodiment.

FIG. 5 illustrates a schematic diagram of the zig-zag transformer 10 combined with a CMMI topology to further extend balancing capability to minimize zero-sequence current and negative-sequence currents in the three-phase, four-wire electrical distribution panel or sub-panel in one embodiment. With respect to the topology of FIG. 5, there is shown an implementation that, in addition to the CMMI module 30d in the neutral conductor, further adds delta-connected CMMI modules 30a, 30b and 30c between each of the three phases of the power system. This allows more robust balancing of differences between phase currents known as negative-sequence current that is caused by unbalanced line-to-line loads. The combination of the delta-connected CMMI branches 30 and the zig-zag transformer 10 as shown leads to the overall best balancing capability, though with a higher complexity. It will be appreciated that the delta-connected CMMI modules 30a, 30b and 30c can be added to any of the embodiments disclosed herein.

Figure 6:
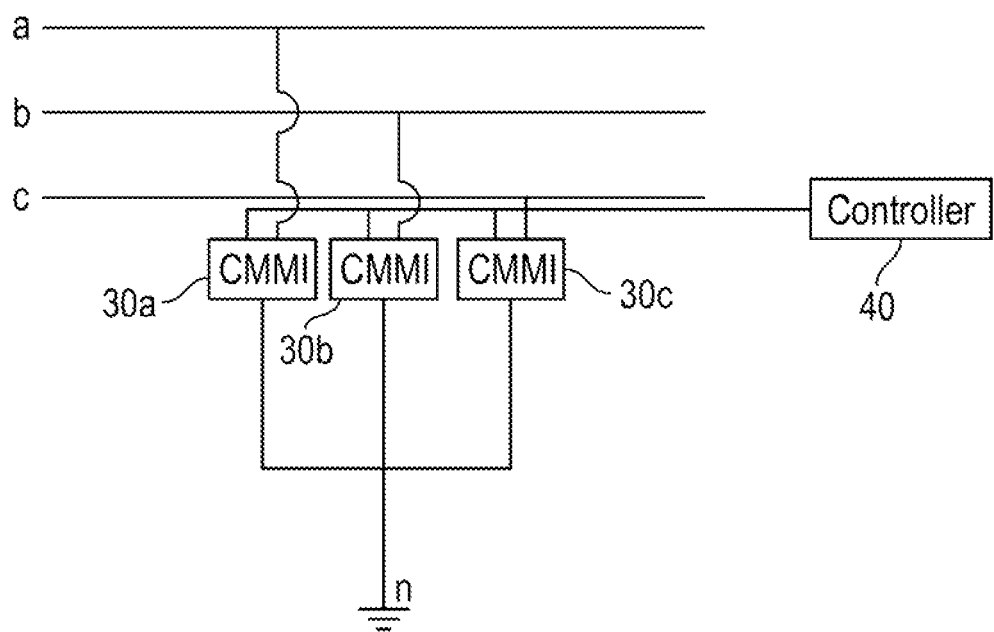
FIG. 6 is a schematic diagram of a CMMI topology without a zig-zag transformer to further extend balancing capability to minimize zero-sequence current in the three-phase, four-wire electrical distribution system in accordance with an embodiment.

FIG. 6 illustrates a schematic diagram of a CMMI topology without the zig-zag transformer 10 to further extend balancing capability to minimize zero-sequence current in the three-phase, four-wire electrical distribution panel or sub-panel in one embodiment. With respect to the topology of FIG. 6, there is shown an implementation that does not use the zig-zag transformer 10. Instead, the CMMI module 30a is coupled between phase a and the neutral conductor, CMMI module 30b is coupled between phase b and the neutral conductor, and CMMI module 30c is coupled between phase c and the neutral conductor. Although the embodiment of FIG. 6 is in some ways simpler than the other embodiments disclosed herein, this embodiment requires full-voltage rated CMMI branches 30. It does however carry the capability of injecting neutral current while adding the capability of reactive power support at the fundamental grid frequency without the delta-connected CMMI modules of FIG. 5. This reactive power support is enabled through independent control of the CMMI branch impedances, which can now carry positive-sequence current that would otherwise be blocked by the zig-zag impedance.

The CMMI 30 branches inherently can only produce volt-ampere reactive (VAR) power (positive or negative), so they can behave as a variable inductor or capacitor. If the CMMI 30 were asked to emulate an impedance with a real power (R) component (either positive R. or in the present case negative R), then the CMMI 30 would either overcharge or undercharge the internal link. Thus, in accordance with a number of embodiments of the presently disclosed concept, a control loop is provided in the controller 40 that injects a small amount of R to replenish any internal power loss and regulate the capacitor voltages of the CMMI 30. The present inventors have determined in power grid studies that the amount of compensation that can be provided by the present embodiments is tremendously enhanced by being able to provide a small amount of real power for many power grid conditions under conditions where the power grid has some zero-sequence voltage. In various embodiments, the injection of real power and/or the absorption of real power may be unidirectional or bidirectional.

Figure 7:
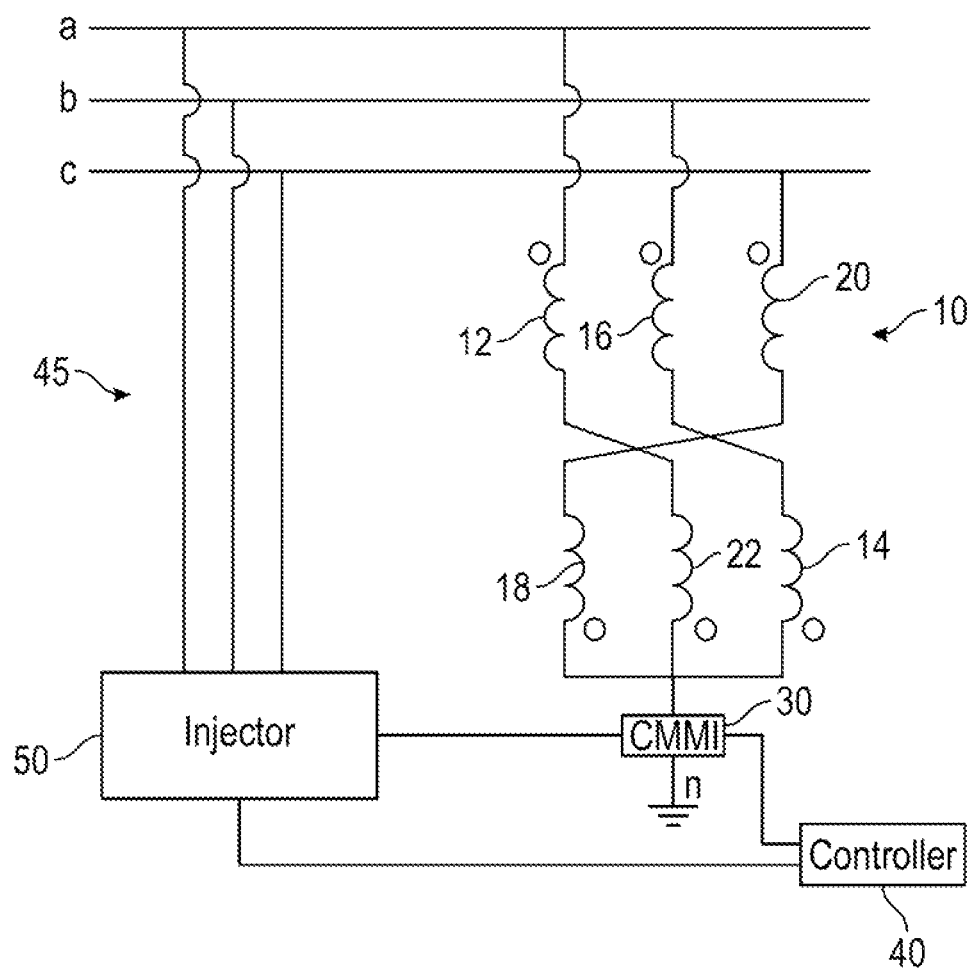
FIG. 7 is a schematic diagram illustrating a zero-sequence current balancer employing a real power injector circuit according to an exemplary embodiment of the disclosed concept.

FIG. 7 schematically illustrates an alternative embodiment of the configuration of FIG. 3, wherein like components are labeled with like reference numerals. As seen in FIG. 7, a zero-sequence current balancer 45 according to the disclosed concept is provided and is coupled to phase lines a, b, c and n for injecting real power into and/or absorbing real power from the system (in a unidirectional or bidirectional manner) to replenish any internal power loss and/or regulate the capacitor voltages of one or more CMMIs. More specifically, as also seen in FIG. 7, zero-sequence current balancer 45 includes four terminal zig-zag transformer 10, CMMI 30, controller 40 and a real power injector 50 inserted between CMMI 30 and phase a, phase b, and phase c. Adding real power injector 50 allows zero-sequence current balancer 45 to inject (and/or, in some embodiments, to absorb) zero-sequence current over a wider angle of load conditions. The real power injected by real power injector can be relatively small compared to the overall compensator KVA rating, because the zero-sequence voltage is small relative to the rated voltage in practical grid conditions. This implies that the zero-sequence real power observed at the terminals of zero-sequence current balancer 45 is low compared to the grid power.

In the non-limiting exemplary embodiment, CMMI 30 is a single phase, n-module CMMI. As such, CMMI 30 includes n modules, with each module comprising a full bridge inverter (FBI) and a capacitor as shown in, for example and without limitation, U.S. Pat. No. 9,294,003 to Peng. It will be appreciated, however, that such an implementation is meant to be exemplary only, and that the disclosed concept may be employed in connection with other, alternative CMMI configurations. In addition, as will be appreciated by those of skill in the art, four terminal zig-zag transformer 10 receives the three phases a, b and c, and passes the common mode sum of all three phases as an AC output signal. If the phases a, b and c are balanced, the sum will be zero, and if the phases a, b and c are not balanced, the sum of all three phases as the output of the four terminal zig-zag transformer 10.

Furthermore, as used herein, the term "controller" shall mean a programmable analog and/or digital device (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

The injection of real power by the real power injector 50 can be unidirectional or bidirectional (i.e., including absorption) and, as seen in FIG. 7, it receives this power from a separate connection to the AC line (phases a, b and c). This connection is before (upstream from) zig-zag transformer 10 in some embodiments, but can be made fully internal to the overall imbalance compensator in other embodiments. In some embodiments, there is no control mechanism for the real power injector 50. The amount of real power injected is simply a function of how much current the CMMI 30 draws from this power source. In other embodiments, such as in a bidirectional version to name just one non-limiting embodiment, some regulation control of the real power injector 50 may be desired or required. In some embodiments, such regulation control of the real power injector 50 may be accomplished by replacing the diode rectifier (See FIG. 8 and accompanying description below) with an actively controlled rectifier using MOSFETs or IGBT devices. Such control is analogous to the line-side front end of an industrial motor drive, for instance, when bidirectionality is needed. The unidirectional version of the real power injector 50 provides simplification and cost advantage in some embodiments. In embodiments where the injection of real power is controlled by the controller 40, the control case may comprise regulation of the capacitor voltage. Other control cases, such as, without limitation, some form of power limiting or other droop-based implementation, may also be used.

Figure 8:
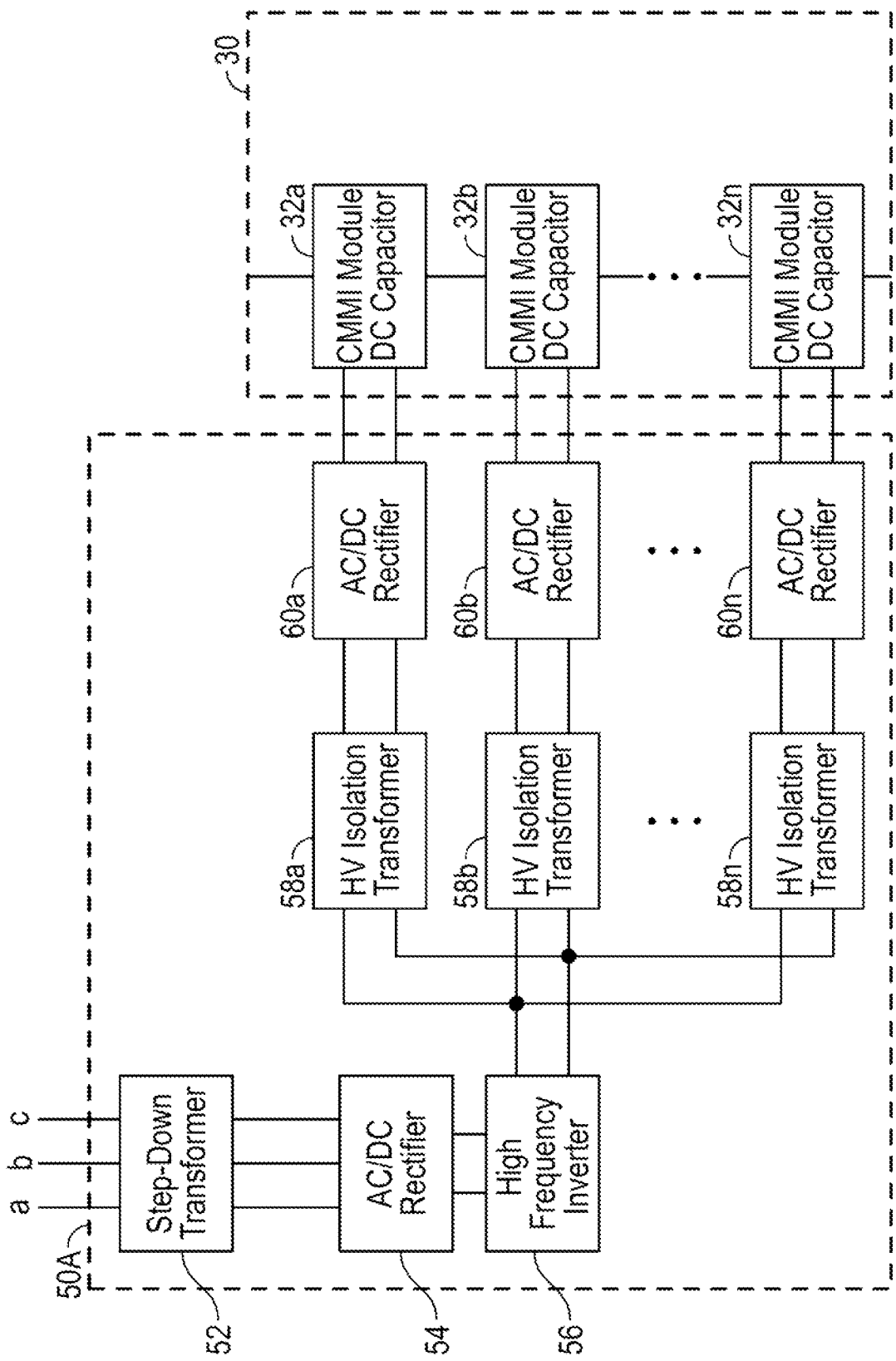
FIG. 8 is a schematic diagram illustrating a real power injector circuit according to one non-limiting exemplary embodiment of the disclosed concept.

FIG. 8 schematically illustrates a real power injector 50 (labelled 50A in FIG. 8) according to a first, non-limiting exemplary embodiment of the disclosed concept. The three-phase input of the real power injector 50A is drawn from phases a, b and c of the power grid. As seen in FIG. 8, these inputs are applied to a step-down transformer 52. The step-down transformer 52 is illustrated as a three-phase step-down transformer, but other embodiments may comprise three single-phase transformers. The output of the step-down transformer 52 is applied to the input of an AC/DC rectifier 54. The DC output of the AC/DC rectifier 54 (i.e., from the single DC link output of the AC/DC rectifier 54) is applied to the input of a high frequency inverter 56. The high frequency inverter 56 converts the received DC signal into a single phase, high frequency AC signal. In the non-limiting exemplary embodiment, the frequency of the single phase, high frequency AC signal output by the high frequency inverter 56 is between 5 kHz and 50 kHz. The output of the real power injector 50A will be applied to each of the capacitors 32a, 32b, . . . 32n of the CMMI 30, so the output of the high frequency inverter 56 within the real power injector 50A is applied to the inputs of n high frequency branches within the real power injector 50A.

As seen in FIG. 8, each high frequency branch of the real power injector 50A includes a single-phase high voltage isolation transformer 58a-58n (e.g., operating on 4 to 15 kV systems). The output of each of the high voltage isolation transformers 58 is coupled to the input of an AC/DC rectifier 60a-60n. The output of each of the AC/DC rectifiers 60 is applied to a respective one of the capacitors 32 of the CMMI 30.

Although the embodiment of FIG. 8 is shown with single-phase high-frequency circuits (i.e., high frequency inverter 56, high voltage isolation transformer 58, and AC/DC rectifier 60), in other embodiments this can be implemented using three-phase components. The AC/DC rectifiers 54, 60 can be simple diode-based rectifiers in some embodiments, or active bidirectional rectifiers in other embodiments.

Advantages of the embodiment of FIG. 8 include (but are not limited to): a) the step-down transformer 52 may be implemented using a standard product; b) the high-frequency link comprising the AC/DC rectifier 54 and the high frequency inverter 56 allows smaller high voltage isolation transformers 58; c) the single-phase high voltage isolation transformers 58 can be built on toroid cores with a separate secondary and primary for high-voltage standoff.

It will be appreciated that the high frequency inverter 56 allows for the conversion to a much higher frequency for the internal distribution. One embodiment uses a 4000 Hz square wave internal link, although other embodiments may use different frequencies (e.g., and without limitation, 4 kHz to 12 kHz, 4 kHz to 20 kHz, or 20+ kHz) and/or waveform shapes. Because the transformer size and weight are roughly inversely proportional to frequency, a concomitant reduction in hardware size is enabled by the higher frequency. It will be appreciated that other embodiments may use any frequency for the internal link.

Figure 9:
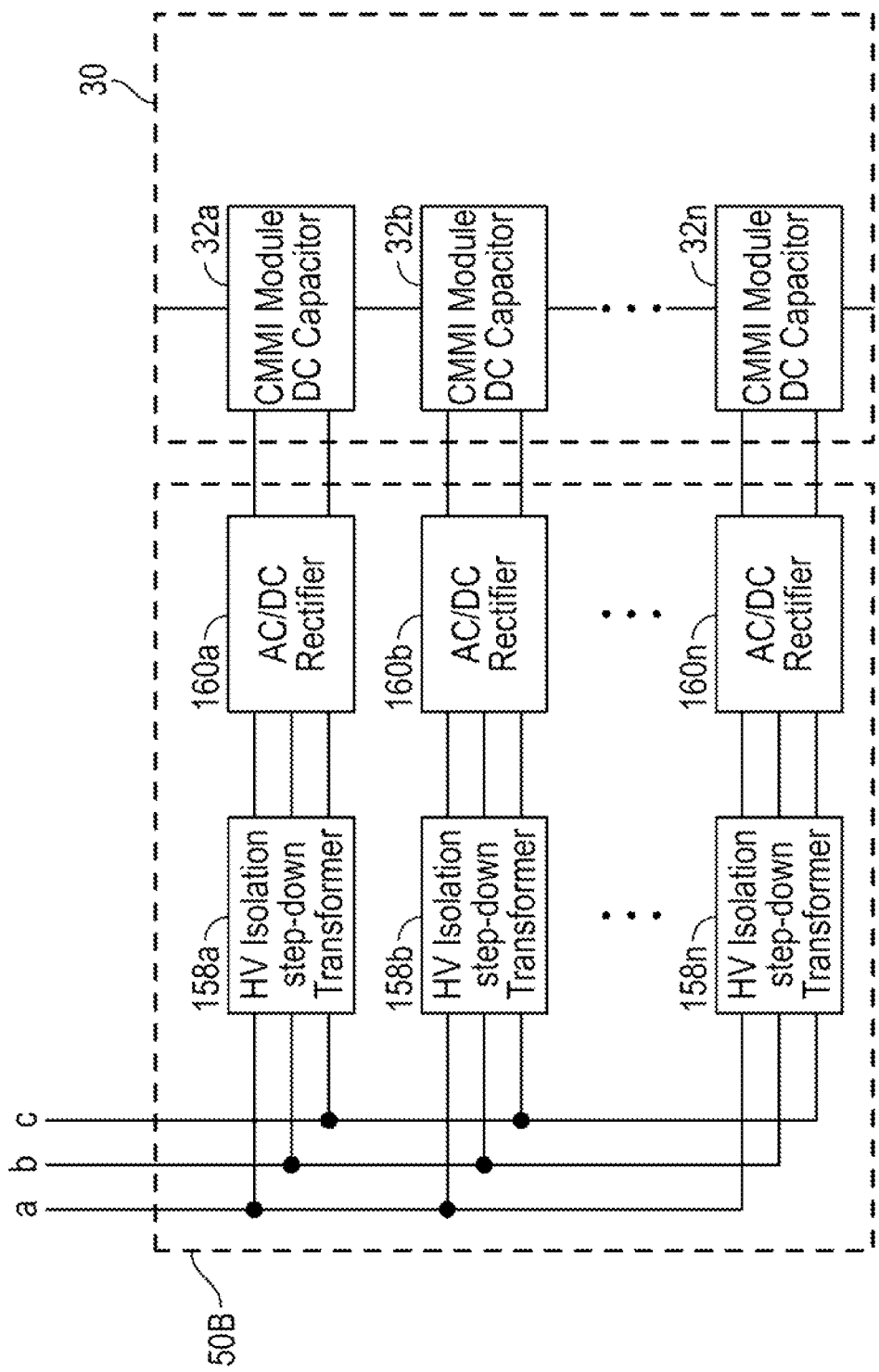
FIG. 9 is schematic diagram illustrating a real power injector circuit according to another non-limiting exemplary embodiment of the disclosed concept.

FIG. 9 schematically illustrates a real power injector SOB according to another non-limiting exemplary embodiment. The three-phase input of the real power injector SOB is drawn from phases a, b and c of the power grid. These inputs are applied directly to the inputs of n three-phase high voltage isolation transformers 158a-158n. The three-phase outputs of each of the three-phase high voltage isolation transformers 158 is coupled to the input of a respective three phase AC/DC rectifier 160a-160n. The output of each of the three-phase AC/DC rectifiers 160 (i.e., from the single DC link output of the AC/DC rectifier 160) is applied to a respective one of the n capacitors 32 of the CMMI 30.

Although the embodiment of FIG. 9 is shown with three-phase high voltage isolation transformers 158 and three-phase AC/DC rectifiers 160, in other embodiments this can be implemented using single-phase components. The AC/DC rectifiers 160 can be simple diode-based rectifiers in some embodiments, or active bidirectional rectifiers in other embodiments. Single phase isolation transformers could be arranged to distribute the load on all three main input phases, especially if using a multiple of three CMMI modules (to ensure the draw of a balanced load on all three phases).

Figure 10:
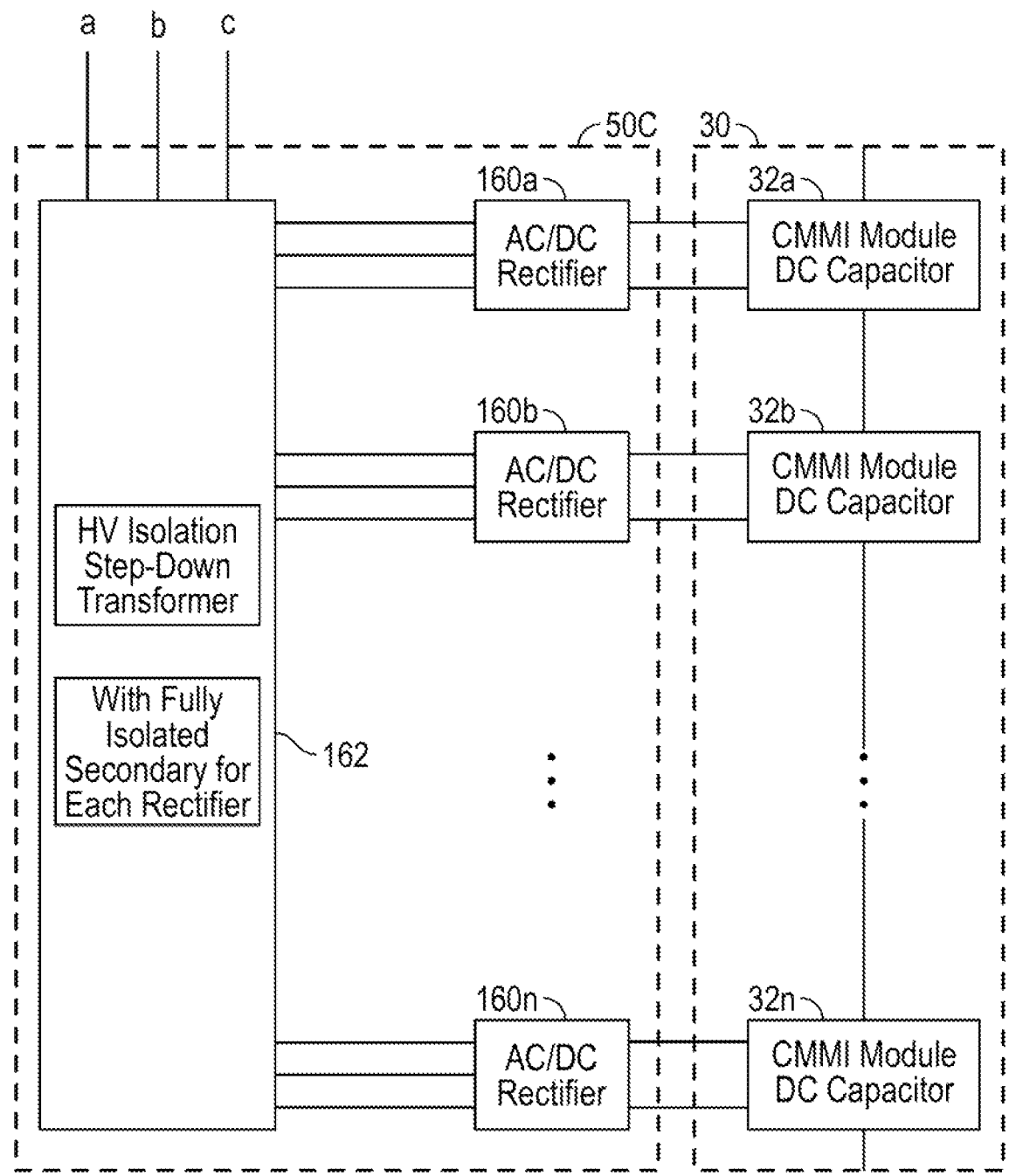
FIG. 10 is a schematic diagram illustrating a real power injector circuit according to a further non-limiting exemplary embodiment of the disclosed concept.

FIG. 10 schematically illustrates a real power injector 50C according to another non-limiting exemplary embodiment. The three-phase input of the real power injector 50C is drawn from phases a, b and c of the power grid. These inputs are applied to the inputs of a three-phase high voltage isolation step down transformer 162. In one embodiment, the three-phase high voltage isolation step down transformer 162 has a fully isolated secondary for each of the AC/DC rectifiers 160a-160n. The outputs of each of the three-phase high voltage isolation step down transformer 162 secondaries are coupled to the input of a respective three-phase AC/DC rectifier 160a-160n. The output of each of the three phase AC/DC rectifiers 160 (i.e., from the single DC link output of the AC/DC rectifier 160) is applied to a respective one of the capacitors 32 of the CMMI 30.

Although the embodiment of FIG. 10 is shown with three-phase high voltage isolation step down transformer 162 secondaries, in other embodiments the secondaries can be built with single-phase secondaries and AC/DC rectifiers 160. The AC/DC rectifiers can be simple diode-based rectifiers in some embodiments, or active bidirectional rectifiers in other embodiments. Single phase isolation transformers could be arranged to distribute the load on all three main input phases, especially if using multiple of three CMMI modules (to ensure the draw of a balanced load on all three phases).

Figure 11:
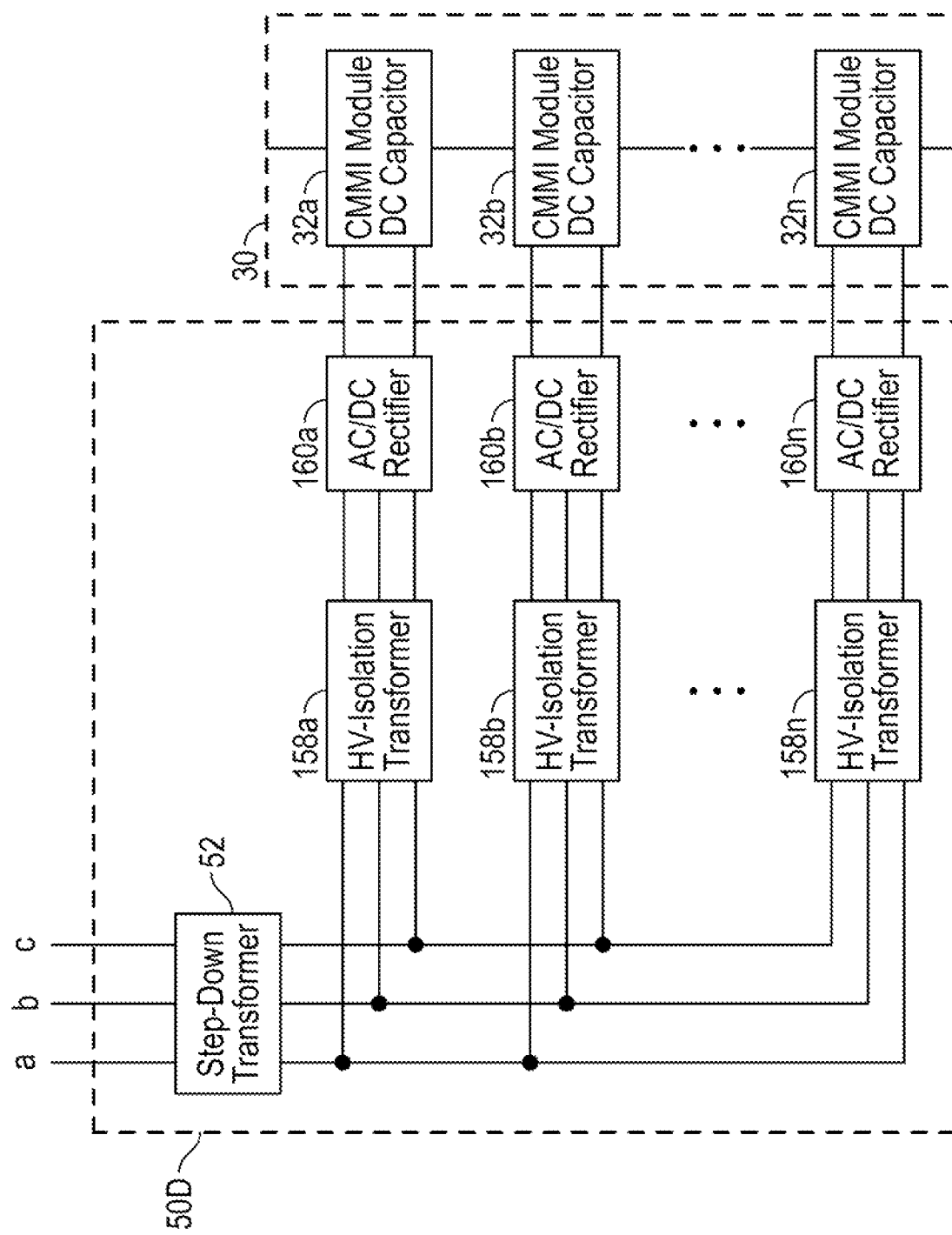
FIG. 11 is a schematic diagram illustrating a real power injector circuit according to still a further non-limiting exemplary embodiment of the disclosed concept.

FIG. 11 schematically illustrates a real power injector 50D according to another non-limiting exemplary embodiment. The three-phase input of the real power injector 50E is drawn from phases a, b and c of the power grid. These inputs are applied to a step-down transformer 52. The step-down transformer 52 is illustrated as a three-phase step-down transformer, but other embodiments may comprise three single-phase transformers. The outputs of the step-down transformer 52 are applied to the inputs of n three-phase high voltage isolation transformers 158a-158n. The outputs of each of the three-phase high voltage isolation transformers 158 are coupled to the input of a respective three phase AC/DC rectifier 160a-160n. The output of each of the three-phase AC/DC rectifiers 160 (i.e., from the single DC link output of the AC/DC rectifier 160) is applied to a respective one of the capacitors 32 of the CMMI 30.

Although the embodiment of FIG. 11 is shown with three-phase high voltage isolation transformers 158 and three-phase AC/DC rectifiers 160, in other embodiments this can be implemented using single-phase components. The AC/DC rectifiers can be simple diode-based rectifiers in some embodiments, or active bidirectional rectifiers in other embodiments. Single phase isolation transformers could be arranged to distribute the load on all three main input phases, especially if using multiple of three CMMI modules (to ensure the draw of a balanced load on all three phases).

Figure 12:
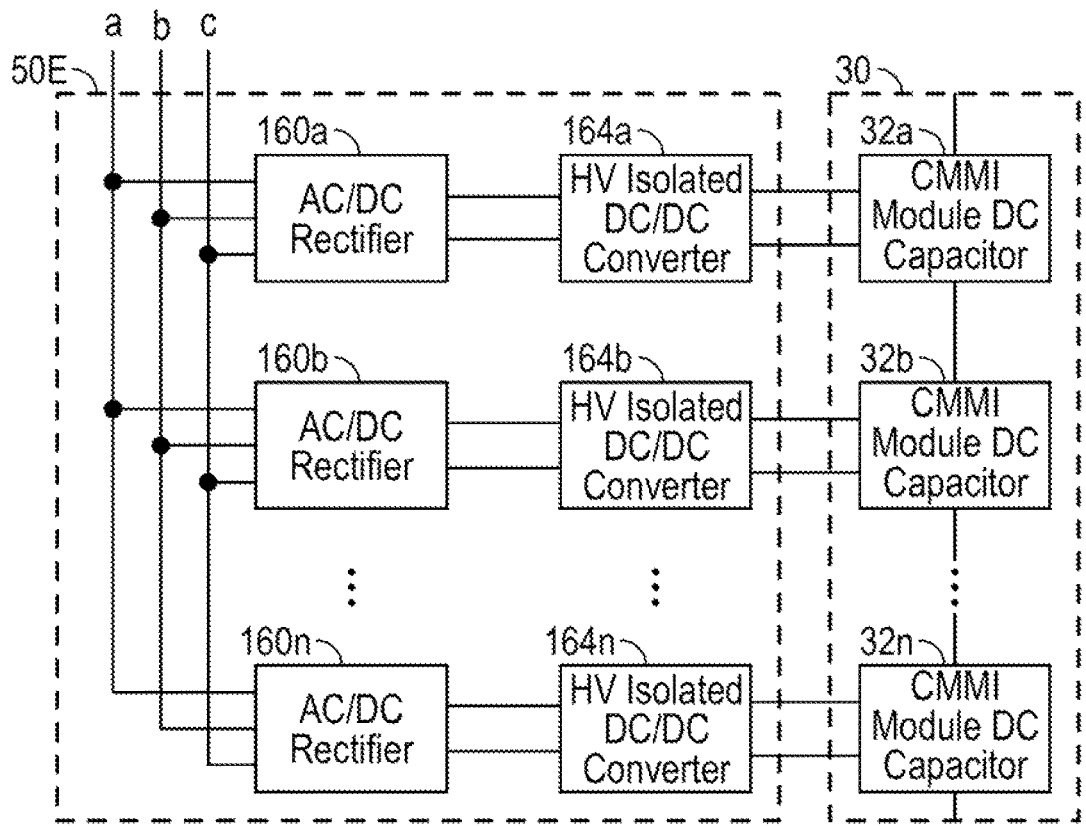
FIG. 12 is a schematic diagram illustrating a real power injector circuit according to yet a further non-limiting exemplary embodiment of the disclosed concept.

FIG. 12 schematically illustrates a real power injector 50E according to another non-limiting exemplary embodiment. The three-phase input of the real power injector 50E is drawn from phases a, b and c of the power grid. These inputs are applied to n three phase AC/DC rectifiers 160a-160n. The output of each of the three-phase AC/DC rectifiers 160 (i.e., from the single DC link output of the AC/DC rectifier 160) is applied to a respective one of n high voltage isolated DC/DC converters 164a-164n, which each convert the input DC voltage to an output DC voltage having a different, e.g., higher, voltage level. The output of each of the n high voltage isolated DC/DC converters 164a-164n is provided to a respective one of the capacitors 32 of the CMMI 30.

Figure 13:
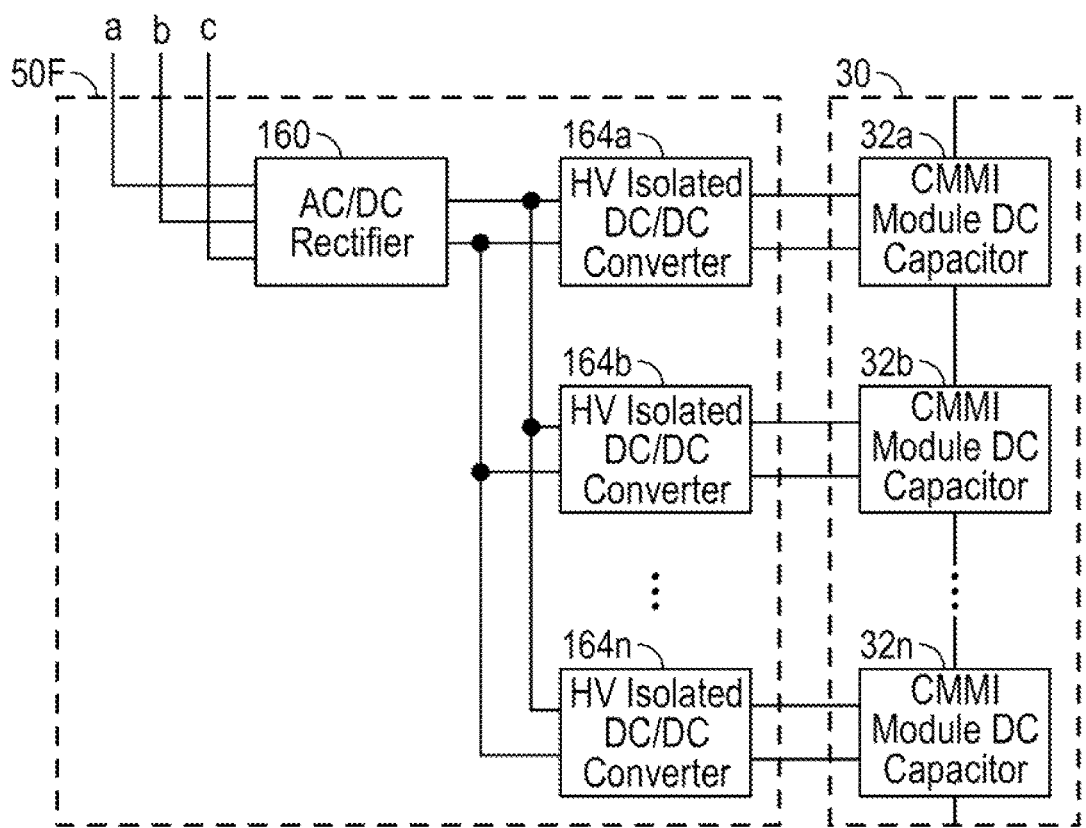
FIG. 13 is a schematic diagram illustrating a real power injector circuit according to still another non-limiting exemplary embodiment of the disclosed concept.

FIG. 13 schematically illustrates a real power injector 50F according to another non-limiting exemplary embodiment. The three-phase input of the real power injector 50E is drawn from phases a, b and c of the power grid. These inputs are applied to a three phase AC/DC rectifier 160. The output of the three-phase AC/DC rectifiers 160 (i.e., from the single DC link output of the AC/DC rectifier 160) is applied to a respective one of n high voltage isolated DC/DC converters 164a-164n, which each convert the input DC voltage to an output DC voltage having a (higher or lower?) voltage level. The output of each of the 11 high voltage isolated DC/DC converters 164a-164n is provided to a respective one of the capacitors 32 of the CMMI 30.

The real power injector 50 according to any of the embodiments described herein may be used to inject and/or absorb real power to/from the CMMI modules 30 in any of the embodiments described herein. All that is necessary is to couple the input of the real power injector 50 to phases a, b and c, and couple an output of the real power injector to each of the capacitors 32a, 32b, . . . 32n of each CMMI 30 utilized in the embodiment.

While the detailed description elaborates workable embodiments of the present invention, the embodiments shall not be construed as a limitation on the patented scope and claims of the present invention and, furthermore, all equivalent adaptations and modifications based on the technological spirit of the present invention shall remain protected within the scope and claims of the invention herein.

What is claimed:
1. A zero-sequence current balancer for a controlling zero-sequence current in a three-phase power system, comprising:
  a cascade multilevel modular inverter (CMMI) coupled to the three-phase power system, wherein the CMMI has a plurality of modules, each module having a module capacitor;
  a real power injector circuit provided between the three-phase power system and the CMMI, wherein the real power injector circuit is structured and configured to cause real power to be injected into and/or absorbed from the CMMI to regulate a voltage of one or more of the module capacitors; wherein the real power injector circuit comprises:
    a step-down transformer coupled to and structured to receive first, second and third phases of the three-phase power system;
    an AC/DC rectifier coupled to and structured to receive an output of the step-down transformer, the AC/DC rectifier being structured to output a first DC signal;
    an inverter coupled to the AC/DC rectifier, the inverter being structured to receive the first DC signal and generate a single phase AC signal; and
    a plurality of branches coupled to the inverter, each of the braches being structured to receive the single phase AC signal, wherein the branches are structured to generate a plurality of second DC signals, each of the second DC signals being provided to a respective one of the module capacitors of the CMMI.

2. The zero-sequence current balancer according to claim 1, further comprising a controller coupled to the real power injector circuit, the controller being structured and configured to control the causing of the injection or absorption of the real power into/from the CMMI.

3. The zero-sequence current balancer according to claim 1, further comprising a zig-zag transformer provided between first, second and third phases of the three-phase power system and the CMMI, wherein the CMMI is provided between the zig-zag transformer and a neutral of the three-phase power system.

4. The zero-sequence current balancer according to claim 1, wherein the inverter is a high frequency inverter and wherein each of the branches includes a single-phase isolation transformer and an AC/DC rectifier.

5. A method of controlling zero-sequence current in a three-phase power system, comprising:

receiving an AC signal in a cascade multilevel modular inverter (CMMI) coupled to the three-phase power system, wherein the CMMI has a plurality of modules, each module having a module capacitor; and causing real power to be injected into and/or absorbed from the CMMI to regulate a voltage of one or more of the module capacitors; wherein the causing comprises generating a plurality of first DC signals in a real power injector circuit coupled to the three-phase power system, each of the first DC signals being provided to a respective one of the module capacitors of the CMMI, and wherein the generating the plurality of first DC signals in the real power injector circuit comprises:

receive first, second and third phases of the three-phase power system;

stepping, the first, second and third phases down to create stepped-down voltages;

rectifying the stepped-down voltages into a second DC signal;

converting the second DC signal into one or more AC signals; and generating the plurality of first DC signals from the one or more AC signals.

\* \* \* \* \*